Sept. 16, 1941.                C. F. SMITH                2,256,155
                              BELT FASTENER
                          Filed June 22, 1938           2 Sheets-Sheet 1

Inventor
Chester F. Smith
By
his Attorney

Sept. 16, 1941.                C. F. SMITH                    2,256,155
                              BELT FASTENER
                           Filed June 22, 1938           2 Sheets-Sheet 2

Inventor
Chester F. Smith
By
his Attorney

Patented Sept. 16, 1941

2,256,155

UNITED STATES PATENT OFFICE 2,256,155

BELT FASTENER

Chester F. Smith, Cuyahoga Falls, Ohio, assignor to Wingfoot Corporation, Wilmington, Del., a corporation of Delaware Application June 22, 1938, Serial No. 215,289

8 Claims. (Cl. 24—33)

The present invention relates to a belt fastener and, particularly, to the type of belt fastener used in connecting the ends of V belts which are adapted to carry a rather heavy load.

The primary object of this invention is to provide a belt fastener which will not flex too freely and which will yield to strains on the belt. V-belts of the cog-type, such as disclosed in this application, are adapted to run over pulleys of rather small diameters and as the belt connector leaves and enters the pulley the belt has a whipping action if the belt connector pivots too freely. This results in the breaking down of the belt structure itself and greatly shortens the length of life of the belt. It is therefore the purpose of this invention to provide a belt fastener which has a resistance to flexing which is substantially equivalent to the resistance which the belt itself offers to flexing as it goes around the pulley. In this way the whipping action normally encountered in belts of this character is eliminated or at least greatly reduced and the life of the belt is increased.

Another object of this invention is to provide a belt fastener of a resilient character which resists pivoting of the ends of the belt by torsional strains set up in the fastener.

Another object of this invention is to provide positive stops on the belt connector for limiting the amount of pivotal movement of the belt fastener to prevent destruction of the resilient portion thereof. In other words the positive stops will limit the amount of angular movement of the parts of the belt connector within the capabilities of the resilient portion thereof so as not to destroy its function as a torsional resistor.

Specifically, my invention has for its object the provision of a resilient member interposed between two pivoted metallic or like rigid members and so connected thereto as to torsionally resist the pivotal movement of the metallic members. In the preferred form of the invention I propose to employ a rubber bushing interposed between a sleeve or like member connected to one metallic part of the belt fastener and a pin or sleeve concentrically arranged within the first sleeve and connected to the other of the metallic members.

A further object of this invention is to provide a fastener of the class described comprising a compressed rubber bushing interposed between two concentrically arranged parts which in turn are connected to a pair of members adapted to be attached to the ends of a belt or the like.

Other objects of this invention will appear hereinafter as the description thereof proceeds, the novel features, arrangements and combinations being clearly set forth in the specification and in the claims thereunto appended.

Figure 1:
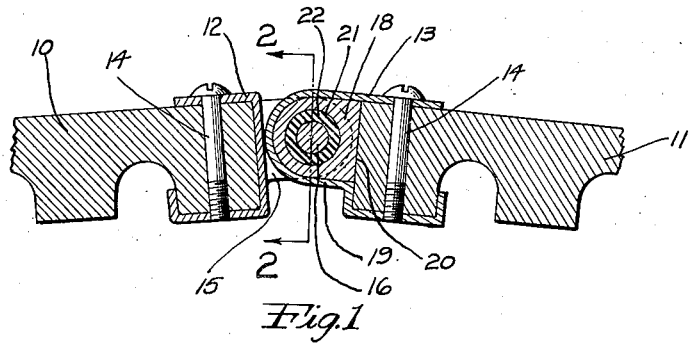
Fig. 1 represents a vertical cross-section through a belt fastener embracing my invention.

In the drawings 10 and 11 represent the ends of a belt or belts to be connected by my improved belt fastener. The belt fastener in Figs. 1 and 2 comprises the members 12 and 13 having portions overlapping the ends of the belt and secured thereto by means of screw fasteners such as 14. The member 12 has projecting ears 15 and a pin 16 which passes through these ears and has the ends thereof upset as at 17 to hold the pin in place. Preferably this pin is welded to the ears or otherwise secured thereto to prevent turning of the pin. The member 13 embraces a block 18 shaped to fit snugly within the loop 19 and abut the end of the belt, as at 20, so that the block 18 cannot turn within the loop 19. The block 18 is centrally provided with a bore 21 which is larger in cross-section than the outer diameter of the pin 16. Interposed between the pin 16 and the bore 21 is a rubber bushing 22 which is in a relatively high state of compression. This compression is secured in the following manner.

The rubber bushing 22 is first vulcanized to the pin 16 and made so that the outer diameter thereof when on the pin 16 is greater than the bore in the block 18 before insertion therein. The pin and bushing are then forced into the bore 21 to place the bushing under a high compression. Due to the high compression, the rubber bushing is prevented from slipping within the bore 21 as there is sufficient force exerted between the bushing and the bore 21 to prevent slippage therebetween. In practice a pin $\frac{5}{16}$" in diameter has a bushing secured thereto which is about $\frac{9}{16}$" outside diameter. This is forced into a ½"

opening, thus reducing the thickness about 25%. The natural tendency for the rubber to regain its original shape creates the pressure against the bore 21.

In operation as the belt travels around a pulley the members 12 and 13 pivot relative to each other and a torsional strain is set up within the rubber bushing 22 which tends to resist the pivotal movement. In other words, the connector offers a substantial resistance to movement about the pulley the same as do all other portions of the belt which must be flexed in traveling over the pulleys. This prevents a whipping action being given to the belt at the time when the belt fastener is leaving or entering the pulley. Due to the fact that there is less vibration set up with a belt connector of this type the life of the belt is increased and more efficient operation is to be had.

Figure 2:
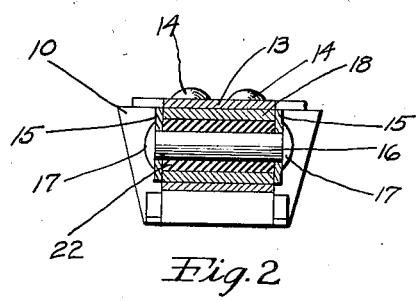
Fig. 2 is a cross-section taken substantially along the line 2—2 of Fig. 1.
Figure 3:
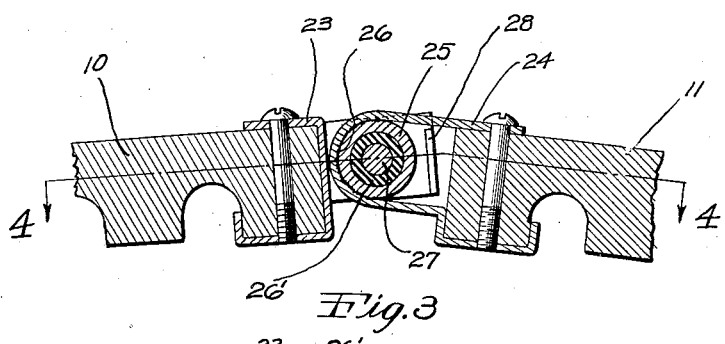
Fig. 3 is a cross-section similar to Fig. 1 showing a modification of the invention illustrated in Fig. 1.
Figure 4:
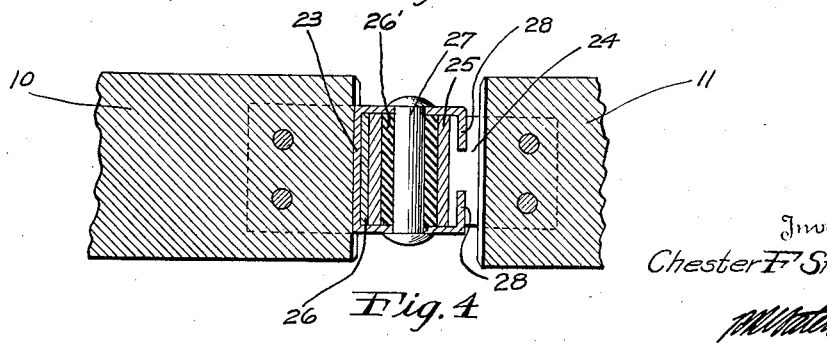
Fig. 4 is a cross-section taken along the line 4—4 of Fig. 3.

In the form of the invention illustrated in Figs. 3 and 4, numerals 23 and 24 indicate parts corresponding to the parts 12 and 13 in Figs. 1 and 2 but in this form of the invention instead of employing a block, such as 18, with a flat surface abutting one end of the belt as at 20, I prefer to employ a tubular sleeve 25 which is welded or otherwise secured to the member 24 at 26, causing the same to act as an integral part of the member 24 and to turn therewith. The bushing 26' is interposed between this sleeve 25 and the pin 27 which correspond to the pin 16 in Figs. 1 and 2.

In this form of the invention the part 23 is additionally provided with inwardly extending tongues 28 which are interposed between the loop formed by the member 24. The upper and lower edges of these tongues as viewed in Fig. 3 are adapted to contact the sides of the loop in the member 24 and prevent excessive rotation of the members 23 and 24 with respect to each other. This is for the purpose of preventing an operator from destroying the fastener or disturbing the relative positions of the parts by turning the members 23 and 24 relative to each other to such an extent that the resilient connection is destroyed or impaired.

Figure 5:
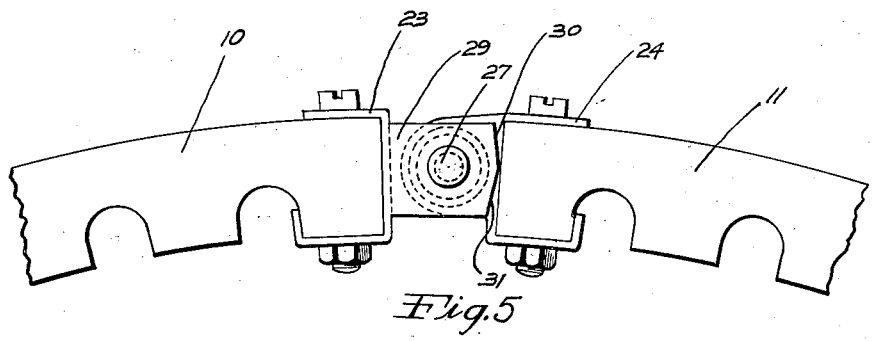
Fig. 5 is an elevational view of still another embodiment of my invention.
Figure 6:
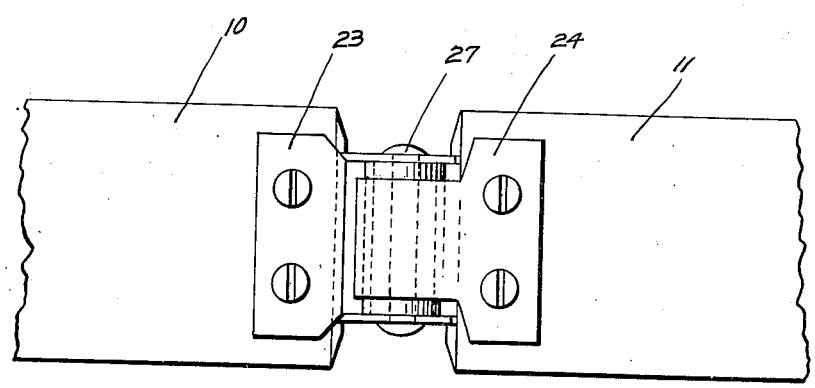
Fig. 6 is a plan view of the device illustrated in Fig. 5.

In Figs. 5 and 6 I have shown a similar connector to that illustrated in Figs. 3 and 4 and similar reference characters refer to similar parts in these figures. However, in this form of the invention, instead of employing tongues such as 28 shown in Figs. 3 and 4, I extend the ears 29 which support the pin 27 to a point in close proximity with the opposing end of the belt. The ends of these ears are beveled at 30 and 31 so as to engage the flat end of the belt after a predetermined amount of angular movement of the members 23 and 24, whereby to resist any further angular movement.

Figure 7:
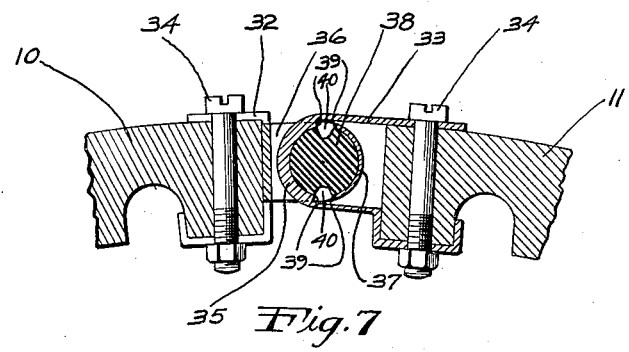
Fig. 7 is a cross-section similar to Figs. 1 and 3 but illustrating a still further modification of my invention.

In Fig. 7 I have illustrated a still further form of my invention in which the belt fastener comprises members 32 and 33 connected to the ends of the belt by bolts 34. The member 33 is looped as at 35 to provide substantially a semi-cylindrical bearing surface on the inner side thereof. Similarly, the ears 36 on the member 32 are connected by a substantially semi-cylindrical bearing member 37 opposed to the semi-cylindrical bearing surface on looped portion 35. Interposed between the members 35 and 37 is a substantially cylindrical rubber block 38 which may be held therein solely by compression or which may be vulcanized to the adjacent bearing surfaces on the members 35 and 37. The torsional strains set up in the block 38 when angular movement is imparted to the members 32 and 33 sets up a resistance similar to that discussed in connection with other forms of the invention. At the ends of the cylindrical bearing surfaces are stops 39 which abut against each other after predetermined angular movement of the parts 32 and 33.

The block 38 is recessed longitudinally as at 40 adjacent the spaces between the stops 39, whereby the rubber will not be crowded out into these spaces when the bushing is compressed or when the members 32 and 33 are rotated with respect to each other. Normally under compression strains the rubber will flow sufficiently to substantially fill the recesses.

It is to be understood that the rubber bushing may be vulcanized to either or both parts of the belt connector as desired. Therefore, I do not wish to be limited to connecting the rubber bushing to only one part. Also if sufficient compression exists it may be found unnecessary that either part of the belt connector be vulcanized or otherwise secured to the rubber bushing, but normally, due to the small diameter of pins 16 and 27, the surface contact with the rubber bushing is not enough to prevent slippage. The fastener needs no lubrication as the rubber absorbs all the turning movement.

Other changes in the particular construction and arrangement of parts may be made without departing from the spirit of this invention and therefore I do not wish to be limited except as hereinafter set forth in the claims.

Having thus fully described my invention, what I claim and desire to secure by Letters Patent of the United States is:

1. A belt connector comprising at least two members, each of which is adapted to be connected to different ones of adjacent ends of a belt, a pin non-rotatably carried by one of said members and a sleeve non-rotatably carried by the other of said members, arranged with the pin extending through said sleeve and spaced therefrom, and a rubber bushing arranged within said sleeve and pin said bushing being bonded to said pin and having the engaging surfaces of said bushings and sleeve held against relative sliding movement with respect to each other.

2. A belt connector comprising at least two members, each of which is adapted to be connected to different ones of adjacent ends of a belt, a pin carried by one of said members and a sleeve carried by the other of said members, arranged with the pin extending through said sleeve and spaced therefrom, and a compressed rubber bushing arranged within said sleeve between said sleeve and pin said bushing being bonded to said pin and having the engaging surfaces of said bushings and sleeve held against relative sliding movement with respect to each other.

3. A belt connector comprising a pair of members adapted to be connected to adjacent belt ends, one of said members having a substantially U-shaped portion adapted to project from the end of said belt, a block adapted to fit within said U-shaped portion and being shaped to prevent turning of said block within said U-shaped portion, said block having an opening therethrough, a pin extending through said opening and connected to said other member in a manner to be held against turning movement with respect thereto, and a compressed bushing of flexible material, said bushing being bonded to said pin and arranged within said opening and filling the space between said pin and the walls of said opening.

4. A belt connector comprising a pair of members adapted to be connected to adjacent belt ends, one of said members having a substantially U-shaped portion adapted to project from the end of said belt, a block adapted to fit within said U-shaped portion and being shaped to prevent turning of said block within said U-shaped portion, said block having an opening therethrough a pin extending through said opening and connected to said other member in a manner to be held against turning movement with respect thereto, and a bushing of flexible material, said bushing being bonded to said pin and arranged within said opening and filling the space between said pin and the walls of said opening, said bushing being held against relative movement with respect to said sleeve.

5. A belt connector comprising a pair of members adapted to be connected to adjacent belt ends, one of said members having a substantially U-shaped portion adapted to project from the end of said belt, a block adapted to fit within said U-shaped portion and being shaped to prevent turning of said block within said U-shaped portion comprising flat surfaces on said block abutting similar surfaces on the legs of said U-shaped portion, said block having an opening therethrough, a pin extending through said opening and connected to said other member in a manner to be held against turning movement with respect thereto, and a bushing of flexible material, said bushing being bonded to said pin and arranged within said opening and filling the space between said pin and the walls of said opening, and means for limiting the pivoting movement of said members.

6. A belt connector comprising a pair of members, one of which carries a sleeve secured thereto and the other of which has a pin secured thereto and held against turning movement with respect thereto, said pin extending through said sleeve, and a rubber bushing secured to said pin and arranged in a highly compressed state between said pin and sleeve.

7. A belt connector comprising members to be attached to adjacent ends of a belt, a rubber bushing embraced by one of said members and a pin non-rotatably mounted on the other member and extending through said bushing, said bushing being in a compressed state between said first member and pin and being bonded thereto.

8. A belt connector comprising members to be attached to adjacent ends of a belt, a rubber bushing embraced by one of said members and a pin non-rotatably mounted on the other of said members and extending through said bushing, said pin being vulcanized to the rubber bushing.

CHESTER F. SMITH.